No. 868,669. PATENTED OCT. 22, 1907.
I. J. KNAPP.
SUPPORT FOR HANDLES.
APPLICATION FILED JUNE 27, 1906.

WITNESSES

INVENTOR
I. J. Knapp.
By Omear & Brock
ATTYS.

UNITED STATES PATENT OFFICE.

IRVIN JAY KNAPP, OF SOUTH BEND, INDIANA.

SUPPORT FOR HANDLES.

No. 863,669.　　　　　Specification of Letters Patent.　　　　　Patented Oct. 22, 1907.

Application filed June 27, 1906. Serial No. 323,615.

*To all whom it may concern:*

Be it known that I, IRVIN JAY KNAPP, a citizen of the United States, residing at South Bend, in the county of St. Joseph and State of Indiana, have invented a new and useful Improvement in Supports for Handles, of which the following is a specification.

This invention relates generally to culinary articles, and is in the nature of a support intended to be attached to the handle of a frying pan or sauce pan for the purpose of holding the said handle elevated above the stove so that the said handle can be conveniently grasped.

The invention also has for an object to provide a device of this kind which can be made from a single piece of wire and will thereby be exceedingly cheap and simple, and furthermore will be adapted to any and all sizes of handles.

With these various objects in view, the invention consists in the novel features of construction hereinafter fully described and pointed out in the claims.

Figure 1:
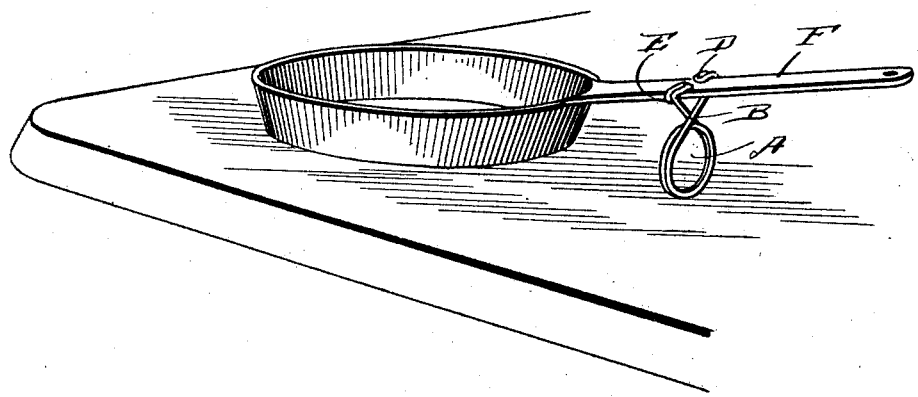
Figure 2:
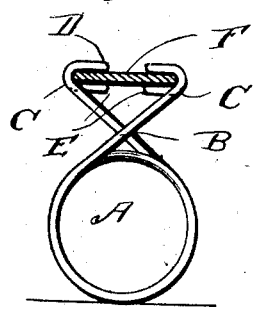
Figure 3:
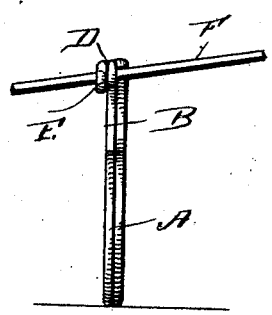
Figure 4:
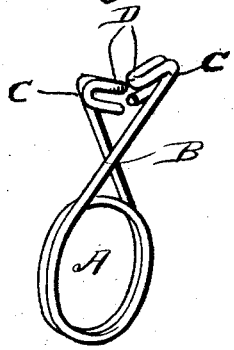

In the drawings forming a part of this specification; Figure 1 is a perspective view illustrating the practical application of my invention. Fig. 2 is a sectional elevation. Fig. 3 is a detail side view, and Fig. 4 is a detail perspective view of the support detached from the handle.

In constructing a support in accordance with my invention I employ a single piece of wire, which at its center is coiled one or more times as shown at A and the projecting portions of the wire are then crossed as shown at B and adjacent each end they are bent substantially at an angle as shown at C and are then bent back upon themselves as shown at D and then again reversed and bent to provide gripping members E whereby the handle F can be embraced and the support securely connected to the handle and the central coiled portion A will rest upon the top of the stove as most clearly shown in Fig. 1 thereby supporting the handle F in such position that it can be conveniently grasped whenever it is desired to lift the frying or sauce pan from the stove.

It will of course be understood that the device being made of spring wire will readily adapt itself to various sizes or shapes of handles, it only being necessary to bring the side edges of the handle into engagement with the gripping fingers or members E. It will also be understood that the support may be quickly and easily detached from one handle when desired and attached to another.

Having thus fully described my invention, what I claim and desire to secure by Letters Patent, is:—

As a new article of manufacture, a support for handles, of culinary utensils consisting of a single piece of spring wire coiled one or more times at its center, the projecting portions extending upwardly and crossed, the end portion thereof being bent downwardly and inwardly one toward the other, then given a return parallel bend, and again curved downwardly and inwardly, forming gripping members adapted to engage the handle to be supported, said support when in operative position being substantially at right angles to said handle.

IRVIN JAY KNAPP.

Witnesses:
　AUGUSTUS BROTHERS,
　ISA D. KNAPP.